(12) United States Patent
Tremley et al.

(10) Patent No.: US 7,482,047 B1
(45) Date of Patent: Jan. 27, 2009

(54) DELAMINATED MULTILAYERED CONTAINER

(76) Inventors: Gary Steven Tremley, 24 Bohemia St., Plainville, CT (US) 06062; Alan Thomas Crampton, 74 Castleknock Way, Dublin 15 (IE)

( * ) Notice: Subject to any disclaimer, the term of this patent is extended or adjusted under 35 U.S.C. 154(b) by 1083 days.

(21) Appl. No.: 10/357,649

(22) Filed: Feb. 4, 2003

(51) Int. Cl.
*B65D 35/08* (2006.01)
*B65D 23/00* (2006.01)
*B29C 45/00* (2006.01)
*B29D 22/00* (2006.01)

(52) U.S. Cl. .............. 428/35.7; 222/215; 222/107; 215/12.2; 264/513

(58) Field of Classification Search .......... 222/92–107, 222/206–215, 423; 264/513, 515; 215/12.1, 215/12.2; 428/35.7
See application file for complete search history.

(56) References Cited

U.S. PATENT DOCUMENTS

| | | | | |
|---|---|---|---|---|
| 2,777,612 | A * | 1/1957 | Bensen | 222/209 |
| 3,936,334 | A * | 2/1976 | Kushida et al. | 156/69 |
| 3,976,224 | A * | 8/1976 | Ericson et al. | 222/107 |
| 4,011,968 | A * | 3/1977 | McGhie et al. | 222/107 |
| 4,020,978 | A * | 5/1977 | Szczepanski | 222/209 |
| 4,145,001 | A * | 3/1979 | Weyenberg et al. | 239/56 |
| 4,188,441 | A | 2/1980 | Cook | |
| 4,261,482 | A | 4/1981 | Yamada et al. | |
| 4,364,989 | A | 12/1982 | Moyle | |
| 4,407,874 | A | 10/1983 | Gehrke | |
| 4,608,286 | A | 8/1986 | Motoishi et al. | |
| 4,615,926 | A | 10/1986 | Hsu et al. | |
| 4,704,314 | A | 11/1987 | Hsu et al. | |
| 4,816,304 | A | 3/1989 | Nohara et al. | |
| 4,939,009 | A | 7/1990 | Beavers et al. | |
| 5,275,311 | A * | 1/1994 | Piarrat | 222/209 |
| 5,301,838 | A * | 4/1994 | Schmidt et al. | 222/95 |
| 5,373,967 | A * | 12/1994 | Grooms et al. | 222/95 |
| 5,849,376 | A | 12/1998 | Oishi et al. | |
| 6,506,464 | B1 | 1/2003 | Montenieri et al. | |
| 6,670,007 | B1 * | 12/2003 | Safian et al. | 428/36.91 |

FOREIGN PATENT DOCUMENTS

GB 2337470 A 11/1999

OTHER PUBLICATIONS

Webster's Ninth New Collegiate Dictionary 252, 442, 671 (1990).*

* cited by examiner

*Primary Examiner*—Kevin P Shaver
*Assistant Examiner*—Melvin A Cartagena
(74) *Attorney, Agent, or Firm*—Steven C. Bauman

(57) ABSTRACT

A squeezable, multi-layer container provides for the accurate dispensing of a controlled amount of liquid product, preferably an adhesive product. The container includes a container body having a dispensing opening and a container interior. The container body is defined by a wall having an inner and outer layer wherein the inner and outer layers are partially delaminated upon manual squeeze pressure applied to the container body.

11 Claims, 2 Drawing Sheets

DELAMINATED MULTILAYERED CONTAINER

FIELD OF THE INVENTION

The present invention relates generally to squeezable containers which are formed of two or more layers of different materials. More particularly, the present invention is directed to a multilayered container which is capable of dispensing a controlled amount of product having delaminated layers to improve squeezability.

BRIEF DESCRIPTION OF RELATED TECHNOLOGY

Certain adhesives, such as those which contain a volatile component, should be housed in a container which prevents ingress of environmental contaminants, such as atmospheric moisture, into the container, and egress of the volatile component(s) of the adhesive out of the container. It is important to provide a container which can control both ingress and egress, because either one will typically be detrimental to the adhesive housed within the container, or the container itself.

In order to provide an effective barrier, containers for housing cyanoacrylate adhesives have been formed from a multi-layer composite structure. One traditional multi-layer material used for cyanoacrylate adhesive containers is shown in FIG. 1. Multi-layer material 10 comprises an inner layer 12 of high-density polyethylene, a tie layer 14 of an adhesive, a layer 16 of nylon or ethylene vinyl alcohol (EVOH), a further tie layer 18 of an adhesive, a layer of ethylene vinyl acetate (EVA) 22 and a final outer layer 24 of low to high-density polyethylene.

Each of the separate layers serves a particular purpose. First, the innermost layer 12 of high density polyethylene (HDPE) provides a moisture barrier to protect the adhesive. The outer layer of PE (HD or LD) contributes to the overall moisture barrier and protects the moisture sensitive EVOH or nylon layer 16. The tie layers 14 and 18 provide a means of adhering the layers together.

The multi-layered material such as the type shown in FIG. 1 may typically be formed in a coextrusion process where the material is coextruded in a tubular form for subsequent formation into a bottle or container configuration. While the coextrusion process itself may be sufficient to initially hold the structural layers of the multi-layer material together, it has been found that without the tie layers which bond the other layers together, the subsequently formed container would easily delaminate. It has been traditionally thought that such delamination is detrimental to the structural integrity of the container and may result in mechanical failure.

Traditional containers formed from multi-layered materials and which are bound together by adhesive tie layers exhibit the requisite structural integrity. It has been found, however, that in many cases it is difficult to accurately dispense small amounts of adhesive from the containers under manual squeeze pressure. The multi-layer structure of the container when bound together by adhesive tie layers renders the formed container relatively stiff. As a result of this stiffness, it is difficult for the user to exert desired manual squeeze pressure to dispense accurate small amounts of adhesive from the container.

It has been found that reducing the thickness of the layers or number of layers forming the multi-layered material will result in a softer, more squeezable bottle. An overall thinner-walled container, however, may result in shortening of product shelf-life and overall lack of package robustness.

Therefore, there remains a need for a container for dispensing adhesives such as cyanoacrylate adhesives which provides adequate barrier properties and strength, yet can be easily squeezed by the human hand to enable accurate dispensing of small quantities of adhesive.

SUMMARY OF THE INVENTION

The present invention provides a multi-layered dispensing container. The container includes a container body having a dispensing opening and a container interior. The container body is formed to have an inner and outer layer where at least a portion of the inner and outer layers are at least partially delaminated upon exertion of manual squeeze pressure. The container body may further include an intermediate layer between the inner and outer layers where at least a portion of the intermediate layer is at least partially delaminated to at least one of the inner and outer layers.

Preferably, the inner layer is formed of polyethylene, preferably high-density polyethylene, the middle layer of EVOH or nylon, while the outer layer may be formed of polyethylene, preferably low-density polyethylene.

A multi-layered squeezable dispensing container of the present invention may be defined by a multi-layer wall structure. The multilayer wall structure includes a first layer and a second layer. First and second layers are joined together in the absence of adhesive therebetween. Such joining of the first and second layers provides for structural integrity of the formed container but results in the partial delamination of the layers. Once the container is squeezed by the user, such delamination allows ease of squeezability with controllable dispensing of small amounts of product from the container.

The multi-layer container further provides a container body having a multi-layered wall structure. The multi-layers are laminated together in the absence of adhesive. The container is manually squeezable to dispense product therefrom. Upon the manual squeeze of the container, the layers become at least partially delaminated.

With these and other advantages and features of the invention that may become apparent, the nature of the invention may be more clearly understood by reference to the following detailed description of the invention, the appended claims, and to the several drawings attached herein.

DETAILED DESCRIPTION OF THE INVENTION

Figure 1:
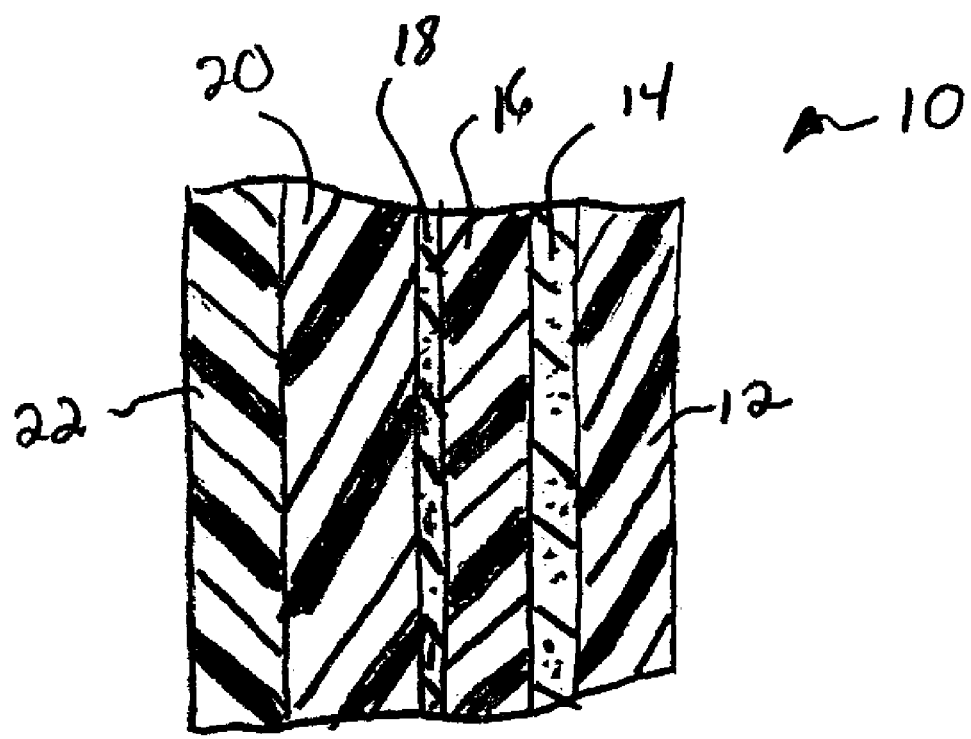
FIG. 1 is a cross-sectional schematic representation of multi-layered material used to form a dispensing container of the prior art.
Figure 2:
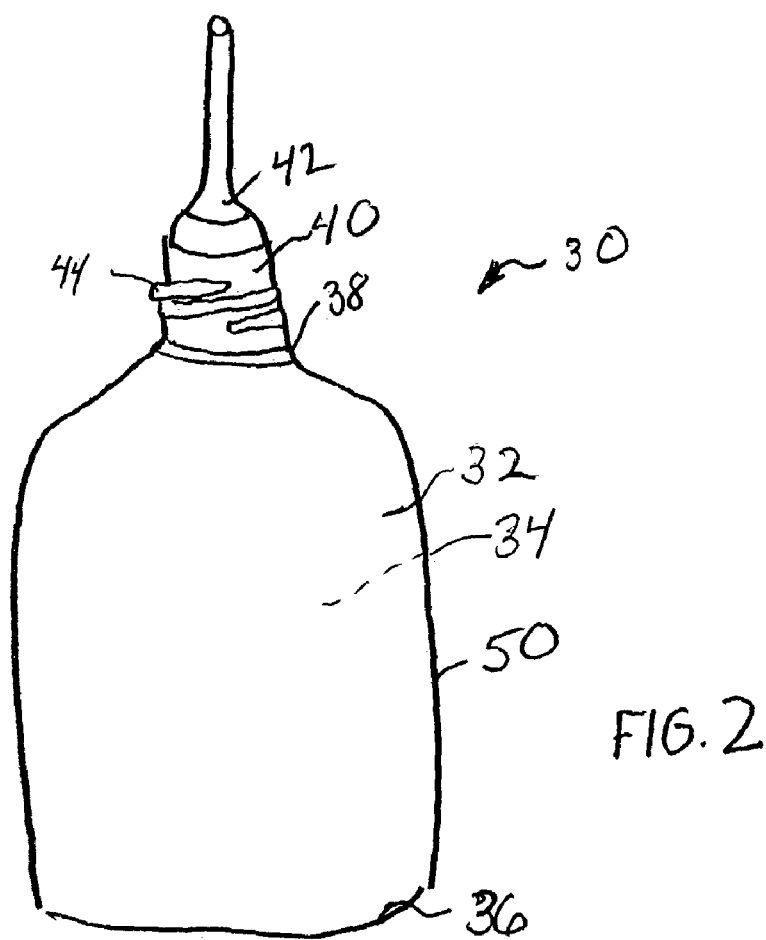
FIG. 2 is a perspective showing of a multi-layered squeezable dispensing container which can be formed in accordance with the present invention.

The present invention provides a squeezable bottle 30 which may be used to accurately dispense small amounts of product therefrom. The product, which may include adhesive products such as cyanoacrylate adhesives, must typically be housed in a container which prevents ingress of environmental contaminants, such as atmospheric moisture, into the container, and prevents the egress of volatile components of the adhesive out from the container. Moreover, the container should allow for the accurate dispensing of a metered amount of product therefrom under manual squeeze pressure. The container 30 of the present invention includes a container body 32 defining a container interior 34 for housing the adhesive product (not shown). The container body 32 includes a closed lower end 36 and an upper end 38 through which the product may be dispensed. The upper end 38 includes an annular neck 40 and an extending dispensing nozzle 42 which allows dispensing of small amounts of product therefrom. The neck 40 may be externally screw-threaded such as at screw threads 44 for accommodating an internally threaded screw cap (not shown) for closing the dispensing nozzle 42.

Figure 3:
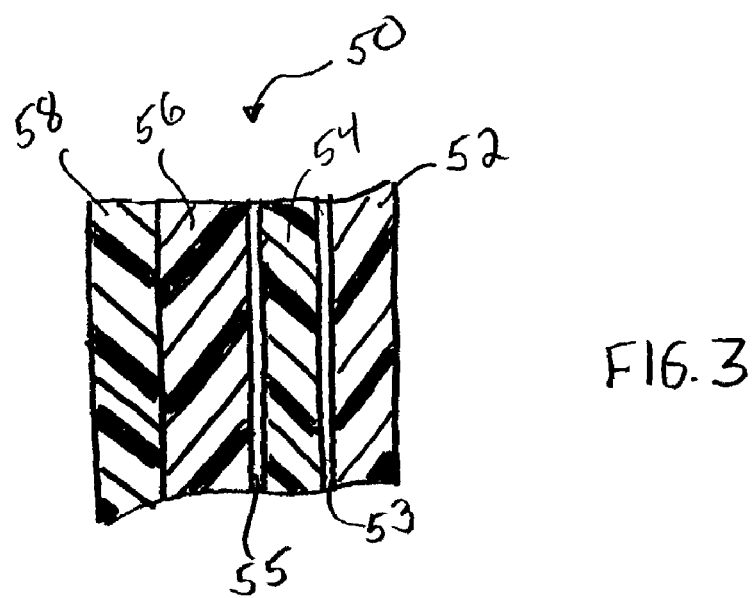
FIG. 3 is a schematic sectional representation of multi-layered material forming the wall of the container of FIG. 2.

The container body 32 is defined by a multilayered container wall 50 more fully shown in FIG. 3. The container wall 50 includes an external layer 52 positioned adjacent a barrier layer 54. An air gap 53 is formed between layers 52 and 54. An intermediate layer 56 is positioned between the barrier layer 54 and an internal layer 58. An air gap 55 is formed between layers 54 and 56. Extended layer 52 defines the external surface of container body 32 while the interior layer 58 forms the inside surface of container body 32.

In the present illustrative embodiment, the individual layers forming the multilayered wall 50 are laminated together in the absence of adhesive therebetween. The container 30 of the present invention is formed by coextruding together the layers to form a multilayered material. Each of the materials which are to form the layers 52, 54, 56 and 58 are placed in separate extruders. The materials are then heated until they reach a flowable condition. Flowable materials are typically extruded together to form a tubular parison. This parison is then blow-molded into the desired container shape in a process which is well-known in the art.

It is important to note that, as the individual layers of the multilayered material are extruded, they are placed together or laminated to one another in the absence of adhesive material therebetween. While the lamination of the layers of the multilayered structure is sufficient to maintain the structural integrity of the container formed thereby during handling and filling, it is insufficient to maintain lamination of the layers during use, such as during the squeezable dispensing of material therefrom. As will be described in detail hereinbelow, manual squeezing of a container formed in the absence of adhesive between the layers will result in the at least partial delamination of the layers.

Preferably, the external layer 52 as well as the internal layer 58 may be formed of polyolefin material, more specifically, polyolefin material selected from the group consisting of polyethylene, polypropylene, and blends of polyethylene and polypropylene. Most preferably, the polyolefin material used to form layers 52 and 58 may be polyethylene, either low density polyethylene (LDPE) or high density polyethylene (HDPE). Other materials can also be effectively used for the external and internal layers.

The barrier layer 54 is a material which provides a vapor barrier. Preferably, the barrier material is a copolymer of ethylene and vinyl, such as, for example, ethylene vinyl alcohol (EVOH). Additionally, another barrier material which is suitable for use as barrier 54 is nylon. The material chosen for the barrier will depend upon the barrier properties required for the container. For example, if the container is required to exhibit excellent vapor (solvent) barrier characteristics and good gas barrier ($O_2$ and $CO_2$) characteristics then EVOH would be a suitable material of choice for the barrier material.

An intermediate layer 56 exists between barrier layer 54 and internal layer 58. The intermediate layer 54 is coextruded with the remaining layers, thus making the intermediate layer shielded from contact with both the product and the external atmosphere of the container by the internal layer and the external layer. Preferred material useful for the intermediate layer material is ethylene vinyl acetate (EVA). EVA acts as an impact modifier and adds to the softness of the resulting bottle.

The bottle 30 formed by multilayer container wall 50 results in a structure where the layers of the wall are initially laminated together (in absence of adhesive). The resulting bottle 30 exhibits requisite structural integrity necessary during handling, filling and shipping. Furthermore, due to the particular material selected for the multilayered wall, the bottle exhibits the necessary barrier properties in order to protect the product contained therein. Bottle may be used in conventional fashion. The user, in order to dispense a metered amount of product from the bottle, squeezes the bottle under manual pressure. As the multilayer walls of bottle 30 are laminated together in absence of adhesive, at least portions of one or more layers of the multilayer wall 50 become delaminated from one another. Multilayered wall becomes "soft" and easy to dispense under manual pressure. It is further contemplated that with certain materials, due to the air gap between layers 52 and 54 and 54 and 56 a "snap" occurs. This snap is audible and is a further indication to the user that the bottle has become soft enabling accurate dispensing of a metered amount of product.

The softness or the resultant squeezability of the bottle of the present invention can be discernibly measured. Ten samples of bottles formed in accordance with the prior art and the present invention were tested. Each sample included a wall thickness of approximately 1.00 mm.

Table I is a comparison between an embodiment of the present invention employing EVOH as a barrier layer with a control sample of the prior art employing a barrier layer of high density polyethylene. The sample of the present invention set forth in Table I includes a 0.3 mm interior high density polyethylene, a 0.3 mm intermediate layer of EVA, a 0.112 mm barrier layer of EVOH and a 0.15 mm exterior layer of low density polyethylene. No adhesive is provided between the EVA intermediate layer and the EVOH barrier layer or the EVOH barrier layer and the low density polyethylene outer layer. The average of the ten samples tested, as well as the standard deviation, is also set forth. The test noted the amount of force needed to compress the side panel of an empty bottle having a 0.25 in dispenser nose nozzle. The bottle is positioned horizontally in a fixture designed to duplicate the index finger and thumb of a person manually dispensing from the bottle. The fixture is attached to the non-moving/moving jaws of an Instron. The top of moving portion of the fixture travels at a rate of 12 inches/minute compressing the bottle to a depth of ¼ in.

TABLE I

| Sample Number | Without adhesive tie layer - EVOH (force in Newtons) | Adhesive tie layer (force in Newtons) |
| --- | --- | --- |
| 1 | 13.46 | 51.87 |
| 2 | 13.10 | 53.02 |
| 3 | 13.35 | 51.33 |
| 4 | 14.26 | 53.60 |
| 5 | 12.77 | 54.22 |
| 6 | 12.51 | 56.80 |
| 7 | 14.22 | 54.86 |
| 8 | 12.71 | 54.58 |
| 9 | 13.71 | 55.38 |
| 10 | 13.06 | 53.33 |
| AVG. | 13.31 | 53.85 |
| Standard Deviation | 0.61 | 1.61 |

Table II sets forth comparison between two samples using nylon as a barrier layer as shown. Table II compares a controlled sample employing adhesively laminated layers with an embodiment of the prior art having a 0.25 mm high density polyethylene inner layer, a 0.28 mm EVA intermediate layer and a 0.206 mm nylon barrier layer and a 0.219 mm high density polyethylene outer layer. In this embodiment of the present invention, no adhesive is provided between the EVA layer and the nylon layer, and the nylon layer and the high density polyethylene layer.

TABLE II

| Sample Number | Without adhesive tie layer - EVA (force in Newtons) | Adhesive tie layer (force in Newtons) |
|---|---|---|
| 1 | 35.63 | 50.98 |
| 2 | 37.39 | 52.53 |
| 3 | 35.95 | 59.92 |
| 4 | 36.29 | 50.66 |
| 5 | 30.57 | 50.18 |
| 6 | 29.73 | 23.11 |
| 7 | 35.74 | 50.31 |
| 8 | 32.46 | 49.69 |
| 9 | 34.03 | 50.22 |
| 10 | 38.80 | 55.11 |
| AVG. | 34.66 | 52.27 |
| Standard Deviation | 2.93 | 3.17 |

As may be appreciated, a significant reduction in the force necessary to squeeze the bottle is seen when comparing the adhesively laminated bottle of the prior art with the unlaminated bottle of the present invention. Such a reduction in force necessary to squeeze the bottle results in easier and more accurate dispensing of a metered amount of product from the bottle.

The invention claimed is:

1. A multilayer dispensing container comprising:
a container body having a dispensing opening and a container interior;
said container body having an inner layer and an outer layer coextruded therewith, wherein at least a portion of at least one of said inner and outer layers are at least partially delaminated upon exertion of manual squeeze pressure on said container body.

2. A multilayer dispensing container of claim 1 wherein said container body further includes:
an intermediate layer between said inner and outer layers, at least a portion of said intermediate layer being at least partially delaminated from at least one of said inner and outer layers.

3. A multilayer dispensing container of claim 2 wherein said portion of said intermediate layer is at least partially delaminated from each of said inner and outer layers.

4. A multilayer dispensing container of claim 2 wherein said intermediate layer is ethylene vinyl acetate (EVA).

5. A multilayer dispensing container of claim 1 wherein said inner layer is selected from the group consisting of ethylene vinyl alcohol (EVOH) and nylon.

6. A multilayer dispensing container of claim 5 wherein said outer layer is high density polyethylene (HDPE).

7. A multilayer dispensing container of claim 1 wherein said inner layer is substantially delaminated from said outer layer.

8. A multilayer dispensing container of claim 7 wherein said inner layer is EVOH and said outer layer is nylon.

9. A multi-layer container which is manually squeezable to dispense product therefrom comprising:
a container body defined by a multi-layer wall;
said multi-layer wall including a first layer and a second layer wherein said first and second layers are laminated together therealong in absence of adhesive therebetween.

10. A container of claim 9 wherein said first and second layers are at least partially delaminated from one another upon said manual squeezing of said container.

11. A container of claim 10 further including an intermediate layer laminated to at least one of said first and second layers in absence of adhesive.

* * * * *